US008184537B1

(12) United States Patent
Gopal et al.

(10) Patent No.: US 8,184,537 B1
(45) Date of Patent: May 22, 2012

(54) METHOD AND APPARATUS FOR QUANTIFYING, PREDICTING AND MONITORING THE CONVERSATIONAL QUALITY

(75) Inventors: Hundraj S. Gopal, Irvine, CA (US); Mohammad Reza Zad-Issa, Irvine, CA (US); Keith T. Chu, Mission Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1377 days.

(21) Appl. No.: 11/700,698

(22) Filed: Jan. 30, 2007

Related U.S. Application Data (60) Provisional application No. 60/772,363, filed on Feb. 10, 2006.

(51) Int. Cl.
*H04L 12/26* (2006.01)
*H04L 12/66* (2006.01)

(52) U.S. Cl. .......................... 370/235; 370/250; 370/352
(58) Field of Classification Search .................... None
See application file for complete search history.

(56) References Cited

U.S. PATENT DOCUMENTS

| | | | |
|---|---|---|---|
| 7,058,048 B2 * | 6/2006 | Clark | 370/356 |
| 2004/0071084 A1 * | 4/2004 | El-Hennawey et al. | 370/230 |
| 2004/0247112 A1 * | 12/2004 | Lee et al. | 379/414 |
| 2006/0098807 A1 * | 5/2006 | Page et al. | 379/406.01 |
| 2006/0153174 A1 * | 7/2006 | Towns-von Stauber et al. | 370/356 |
| 2007/0053303 A1 * | 3/2007 | Kryuchkov | 370/250 |

* cited by examiner

*Primary Examiner* — Marcus R Smith
(74) *Attorney, Agent, or Firm* — Farjami & Farjami LLP (57) ABSTRACT

There is provided a method of quantifying a voice quality in a telecommunication system including a first gateway in communication with a second gateway over a packet network. The method comprises deriving speech parameters from a first speech signal of a first talker received by the first gateway over a first communication line and a second speech signal of a second talker received by the first gateway from the second gateway over the packet network, determining a conversational impairment index using the speech parameters, deriving technology parameters based on voice technology and components in the telecommunication system, determining a technology impairment index using the technology parameters, and mapping the conversational impairment index and the technology impairment index into a conversational quality index to quantify the voice quality in the telecommunication system.

16 Claims, 7 Drawing Sheets

METHOD AND APPARATUS FOR QUANTIFYING, PREDICTING AND MONITORING THE CONVERSATIONAL QUALITY

RELATED APPLICATIONS

The present application is based on and claims priority to U.S. Provisional Application Ser. No. 60/772,363, filed Feb. 10, 2006, which is hereby incorporated by reference in its entirety.

BACKGROUND OF THE INVENTION

1. Field of the Invention

The present invention relates to assessing voice quality in a telecommunication system.

2. Related Art

Modern telecommunication systems, including VoIP networks, use a multitude of telecommunication technologies, which include packetization, echo cancellation, speech coding, noise reduction, automatic gain control (AGC), voice activity detection (VAD), comfort noise generation (CNG), packet loss control (PLC), jitter buffers, etc. All of these technologies contribute significantly to the degradation of the transmitted voice signal over VoIP networks, and consequently, to conversational quality.

Figure 1:
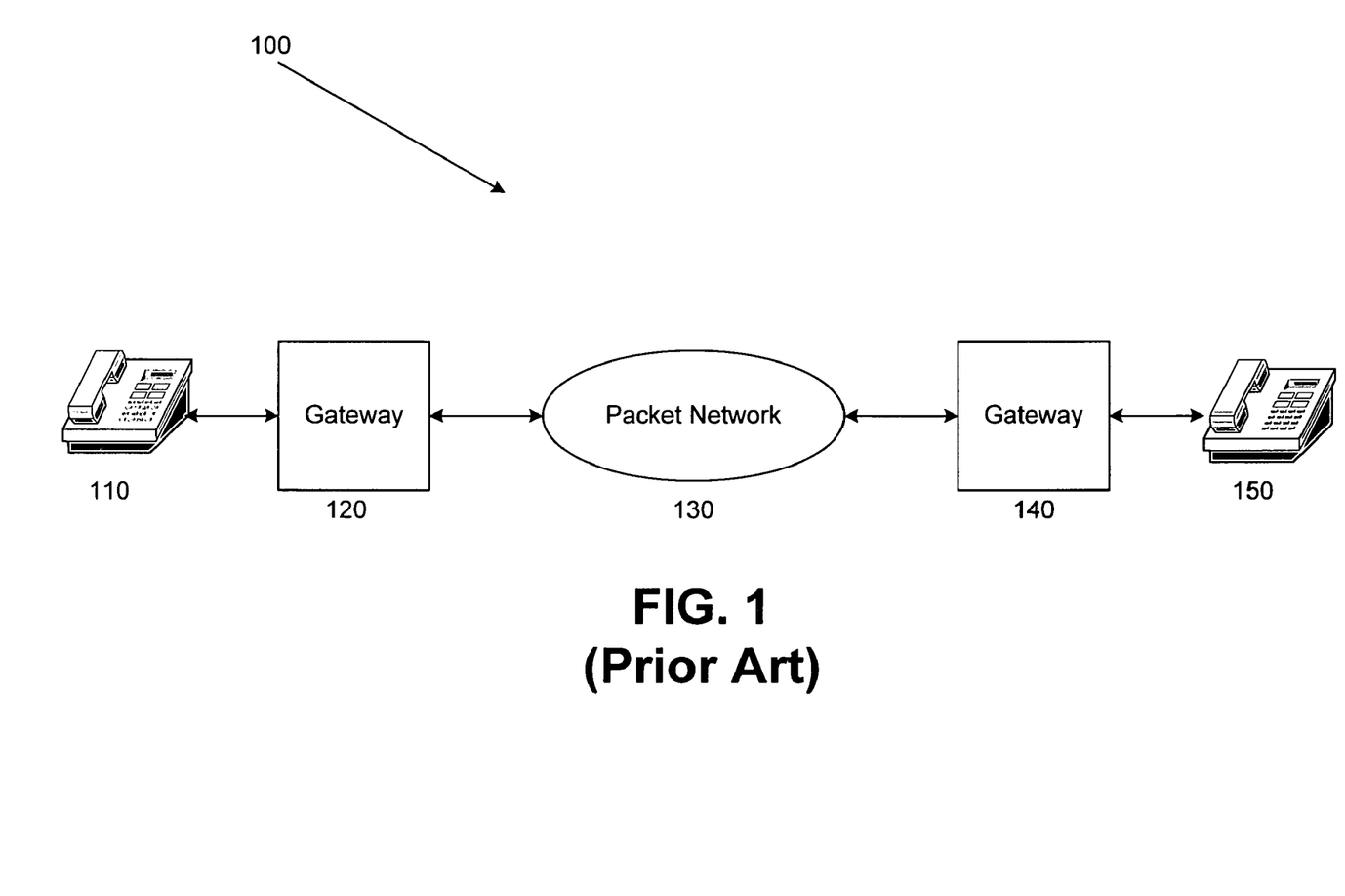
FIG. 1 illustrates a conventional telecommunication system utilizing a packet network for telephone communications.

FIG. 1 illustrates conventional telecommunication system 100 utilizing packet network 130. As shown, telephone 110 is in communication with gateway 120 that is typically located at a central office. Similarly, telephone 150 is in communication with gateway 140 that is typically located at a central office. Gateways 120 and 140 are in turn in communication with each other over packet network 130. Each gateway 120 or 140 receives an analog voice signal from its local telephone 110 or 150, respectively, digitizes the analog voice, encodes the digitized voice and packetizes the encoded data for transmission over packet network 130 to the other gateway 140 or 120, respectively. In turn, the other gateway 140 or 120 performs the tasks of depacketizing and decoding the data received over the packet network for transmission of the analog voice signal to its local telephone 150 or 110, respectively.

For example, in the process of transmitting the speech signal from one side to another, modern telecommunication networks add significant transmission delay that are typically caused by digitization and packetization of the speech signal, which include signal processing delay, routing delay, packet loss, jitter delay, etc. As these transmission delays increase, they interfere with normal and natural conversational patterns. This degradation is beyond the traditional voice signal quality, which is not impacted due to delay. Rather, the increased delay significantly impacts conversational effort, ease and satisfaction. The same is true of other voice technology components used in communication systems. As further examples, noise reduction, automatic gain control, comfort noise generation and echo cancellation technologies add their own degradation to the speech signal. These degradations, in turn, impact conversational quality, effort and user satisfaction in these telecommunication systems.

The current practice in assessing voice quality in the telecommunication network is confined to estimating the voice signal quality. These current techniques, however, do not include any metrics or models for quantifying the effects of delay and other communication impairments on the ease and naturalness of conversations.

Conventional voice quality assessment systems predict and monitor one-way voice quality utilized in conventional models, which are typically referred to as Objective Listening Quality (OLQ) models or simply Voice Quality Models, such as E-Model, PsyVoIP, VQMON and PsyVoIP. Presently, a number of parties are also in pursuit of a conversational quality measurement model, which is reflected in the activities of the International Telecommunications Union (ITU-T), Study Group 12 (SG12).

The E-Model is a 1998 ITU-T standard, referred to as G.107. It is a widely employed opinion model and has been endorsed by ETSI and TIA. E-Model is a network-planning model, which predicts what the voice quality would be by making several assumptions of the network, the terminals used and the usage scenario. E-Model uses several parameters to estimate the voice quality before a call is made. The estimated voice quality aids the network transmission planner to determine what equipment and technologies to deploy for the call. This model does not actually monitor the calls in progress to determine the voice quality of a given call. Therefore, E-Model is not an in-service non-intrusive monitoring device (INMD), but it is merely a planning device. Further, this model is confined to narrow-band telephony (300 Hz-3400 Hz) and includes a limited set of voice technologies, such as narrow-band speech codecs, round-trip delays below 600 ms, bit errors, packet loss, and limited levels of residual echo. However, E-Model fails to include effects of a number of significant voice technologies, such as wideband telephony (for example, 50 Hz-7000 Hz bandwidth), hands-free communications (such as speaker phones), multi-party conversations (conferencing), round-trip delays of greater than 600 ms, noise reduction system, more annoying effects of residual echoes, etc. Even more, E-Model does not measure the actual conversational patterns in predicting voice quality, but it only computes an estimated conversational quality (CQE) due to the effects of a limited set of voice technologies incorporated in that model.

VQMON and PsyVoIP are two other models of monitoring voice quality, which are real-time voice quality monitoring models or in-service non-intrusive monitoring devices (INMDs), which are strictly Objective Listening Quality (OLQ) models as they measure only the one-way voice quality. PsyVoIP is a proprietary model from PsyTechnics, a U.K. company, and VQMON is a proprietary model from Telchemy, a U.S. company. Both these models use only the packet-layer-based information and not the true speech signal in the actual payload. Hence, they are referred to as the packet-based Voice Transmission Quality (VTQ) models. Using information contained at the packet-layer, they compute the one-way voice quality on a real-time basis. These models include the effects of some voice technologies, such as narrow-band speech codecs, packet delay, packet jitter, bit errors packet loss rate, packet loss pattern, etc. However, both models fail to include the effects of a number of significant voice technologies, such as wideband telephony (for example, 50 Hz-7000 Hz bandwidth), hands-free communications (such as speaker phones), multi-party conversations (conferencing), round-trip delays, noise reduction system, effects of residual echoes and echo cancellers, etc. Even more, these models also do not predict total conversational voice quality, but they merely predict a one-way voice quality. Additionally, these models also do not utilize actual conversational parameters and patterns in predicting voice quality.

The fourth model is the ITU-T P.862 standard, entitled "Perceptual Evaluation of Speech Quality (PESQ)." The PESQ model is not an in-service non-intrusive measurement device, because it does not measure or monitor real-time voice quality on a per call basis, but it is merely a Listening Quality (LQ) model. Moreover, PESQ is an intrusive technique, which requires the injection of a reference test signal, and then compares the degraded output speech with the pristine input reference signal. Similar to the limitations of all of the above models, the relevance of this model is confined to narrow-band telephony (300 Hz-3400 Hz) and includes a limited set of voice technologies, such as narrow-band speech codecs, bit errors, packet loss, VAD, and jitter. The PESQ model fails to include the effects of a number of significant voice technologies, such as extended wideband telephony (for example, 50 Hz-14000 Hz bandwidth), hands-free communications (such as speaker phones), multi-party conversations (conferencing), round-trip delays, noise reduction system, effects of residual echoes and echo cancellers, etc. Further, The PESQ model does not predict conversational voice quality; but it merely predicts one-way voice quality, and also does not utilize actual conversational parameters and patterns in predicting voice quality.

However, conversations, by definition, are multi-way communications, where parties talk and hear, which are what most users do when using telecommunication systems. The current models in practice merely capture the effects of one party talking and the other party listening passively. Hence, the existing models are referred to as Listening Quality (LQ) models. While this is a very useful first step, it does not capture the true conversational ease or user dis/satisfaction. Having a model by which one can predict and monitor the effects of delay (and other technological components in a network) on the conversational quality is of paramount benefit to network service providers, operators and technology designers.

SUMMARY OF THE INVENTION

There are provided systems and methods for assessing quantifying, predicting and monitoring conversational quality in a telecommunication system, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

The present application offers a model that can predict and monitor the effects of voice technology components on multi-way conversations. This model, which may be called Conversational Quality Monitor (CQMON), measures the ease and quality of conversation (or the difficulty of conversation) by the users of a telecommunication system when the system includes a multitude of technologies that significantly impact voice quality and conversational quality. CQMON is more representative of a true usage scenario of telecommunication systems than the existing unidirectional measurement of voice quality.

I. Conversational Quality Monitor (CQMON)—A Human Factor Approach

The following innovative approach of the present application has many significant and differentiating offerings. For example, CQMON predicts true total conversational (i.e. multi-way) voice quality. Further, CQMON can be utilized for quantifying real-time per call conversational quality. In addition, CQMON may utilize unique patterns of human conversations and conversational parameters in deducing true conversational quality. Also, CQMON may be applicable to a much wider range of voice and other technologies used in telecommunications networks.

In one embodiment, CQMON generates a Conversational Quality Index (CQI) to reflect the conversational ease and satisfaction. In one approach, CQMON includes three components, which are: (1) The Conversation Pattern Component resulting in a Conversational Impairment Index (CII), (2) The Technology Impairment Index (TII) Component, and (iii) a Mapping Function (MF) Component.

Figure 2:
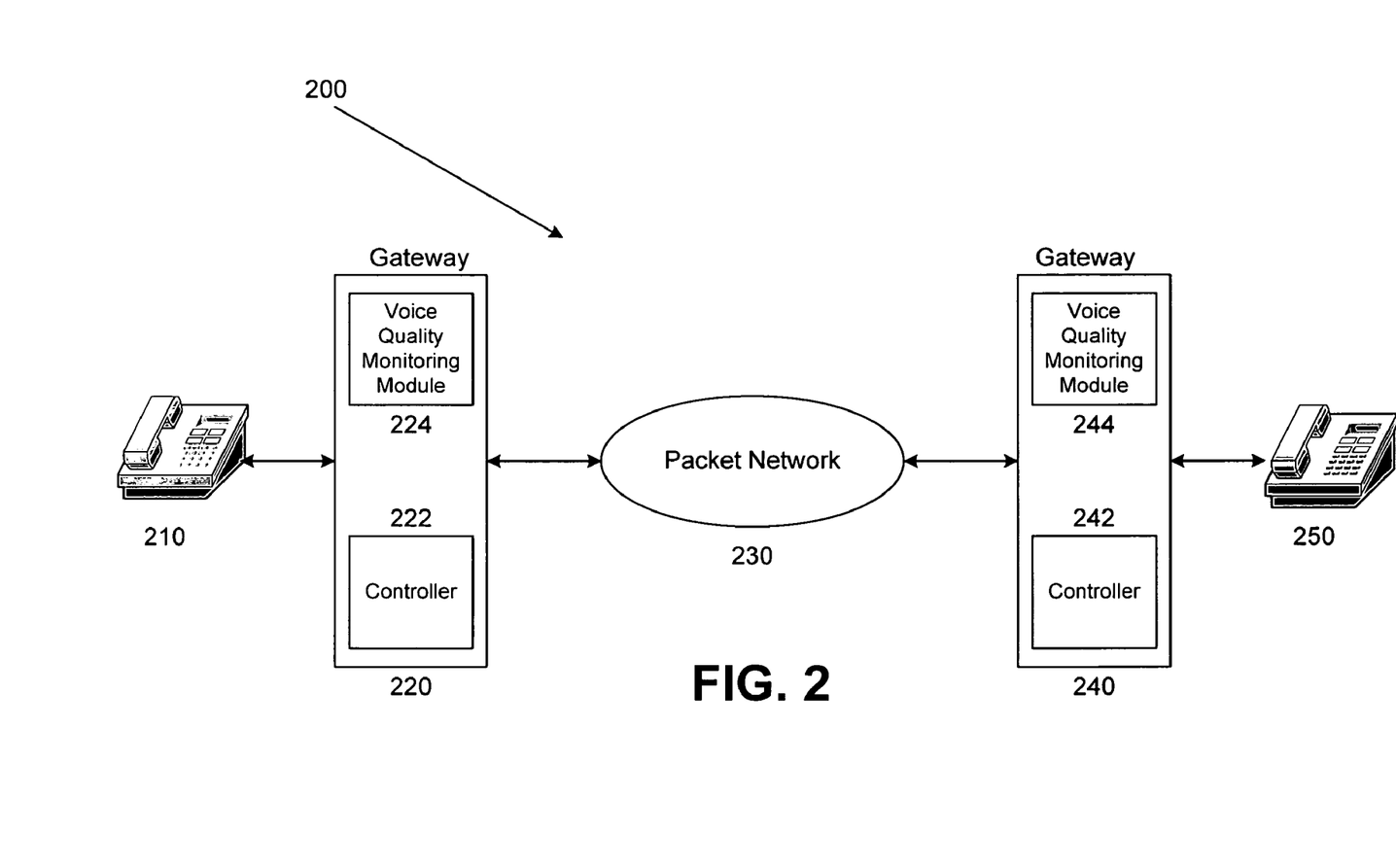
FIG. 2 illustrates a placement of a conversational quality monitoring module of the present invention within a telecommunication system, according to an embodiment of the present invention.

FIG. 2 illustrates a placement of a conversational quality monitoring module of the present invention within a telecommunication system, according to an embodiment of the present invention. Telecommunication system 200 of FIG. 2 includes first gateway 220 in communication with second gateway 240 through a communication or packet network 240. As shown in FIG. 2, first gateway 220 is in communication with first communication device 210, such as a first telephone over a first communication line, and second gateway 240 is in communication with second communication device 250, such as a second telephone over a second communication line. Further, first gateway 210 includes first controller 222 and first voice quality monitoring module 224 configured to quantify, predict and/or monitor conversational quality in telecommunication system 200, based on, for example, local signals from first communication device 210 and remote signals from second gateway 240 over communication network 230. Similarly, second gateway 240 may include second controller 242 and second voice quality monitoring module 244 configured to quantify, predict and/or monitor conversational quality in telecommunication system 200, based on, for example, local signals from second communication device 250 and remote signals from first gateway 220 over communication network 230.

Figure 3:
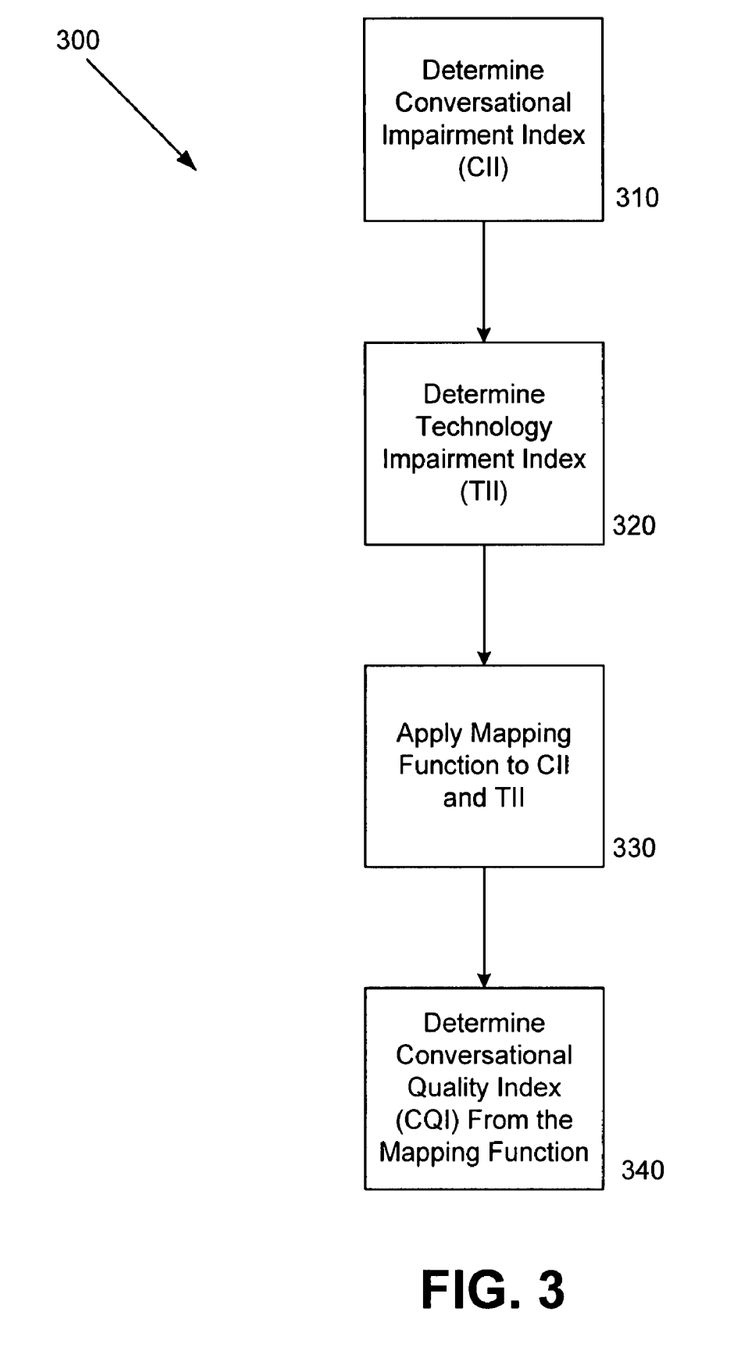
FIG. 3 illustrates a flow diagram of a conversational quality monitoring algorithm for use by the conversational quality monitoring module of FIG. 2, according to an embodiment of the present invention.

FIG. 3 illustrates a flow diagram of conversational quality monitoring or CQMON algorithm 300 for use by voice quality monitoring module 220 or 240 of FIG. 2, according to an embodiment of the present invention. As shown in FIG. 3, CQMON algorithm 300 begins at step 310 by determining conversational impairment index (CII). Next, at step 320, CQMON algorithm 300 may also determine technology impairment index (TII). Thereafter, at step 330, a mapping function (MF) maps CII and/or TII to yield an overall measure of the conversational quality. Next, at step 340, CQMON algorithm 300 determines a conversational quality index (CQI) as an output of the mapping function, where CQI can indicate the conversation ease and satisfaction. Of course, in other embodiments, the mapping function (MF) may use additional indexes and/or generate other indexes. In one embodiment, the higher the value of CQI, the better the conversational quality, and conversely, the lower the value of CQI, the poorer the conversational quality.

A. Conversational Interference Index (CII): Metrics and Measurement Methods for Quantifying the Conversational Voice Quality As discussed above, although conversations are multi-way communications where two or more parties talk and hear during a telecommunication session, the existing models do not capture the effects of this multi-way conversation, but merely capture the effects of one party talking and the other party listening passively. Therefore, the conventional approaches, which are aimed at determining the Listening Quality (or LQ), fail to capture the true conversational ease, satisfaction or dissatisfaction of the users, which is based on the great deal of interaction between the participants in a conversation that shapes the overall satisfaction with the conversational quality. Today, no voice quality or conversational voice quality exists that can effectively measure various aspects of human conversation and derive metrics of true conversational quality. Accordingly, there is an intense need in the art for a set of metrics and a model by which one can quantify the effects of delay and other technological impairments in the telecommunication network on the conversational quality.

In one embodiment of the present invention, there is provided a unique set of metrics and measurement methods to quantify the quality of two-way or multi-way voice communications or conversational quality. Such metrics capture the ease or the difficulty of the end users participating in the conversation and the user satisfaction or dissatisfaction. The outcome of these metrics and models is a value called Conversational Interference Index (CII). In other embodiments, however, the outcome of the metrics may be two or more indexes. In one embodiment, CII may capture and unify the following dimensions: (a) perceptual characteristics of the transmit/received signal and human conversational patterns; (b) the interactivity of the two talkers; and (c) the environment surrounding the two talkers. One benefit of having such metrics is to enable the algorithm designers, network planners and, the service providers to link the impact of technology (and the environment) to the user satisfaction who are holding this conversation in a non-intrusive and real-time/off-line fashion.

The conversational pattern component utilizes specialized knowledge of human conversations to deduce a particular type of conversation pattern, which is referred to as interference pattern. In one embodiment, controller 222 or 242 derives a set of parameters from speech signals that captures certain relevant attributes of human conversation. These parameters and their unique combination result in CII. CII enables us to quantify and monitor the true total conversational quality.

Figure 4:
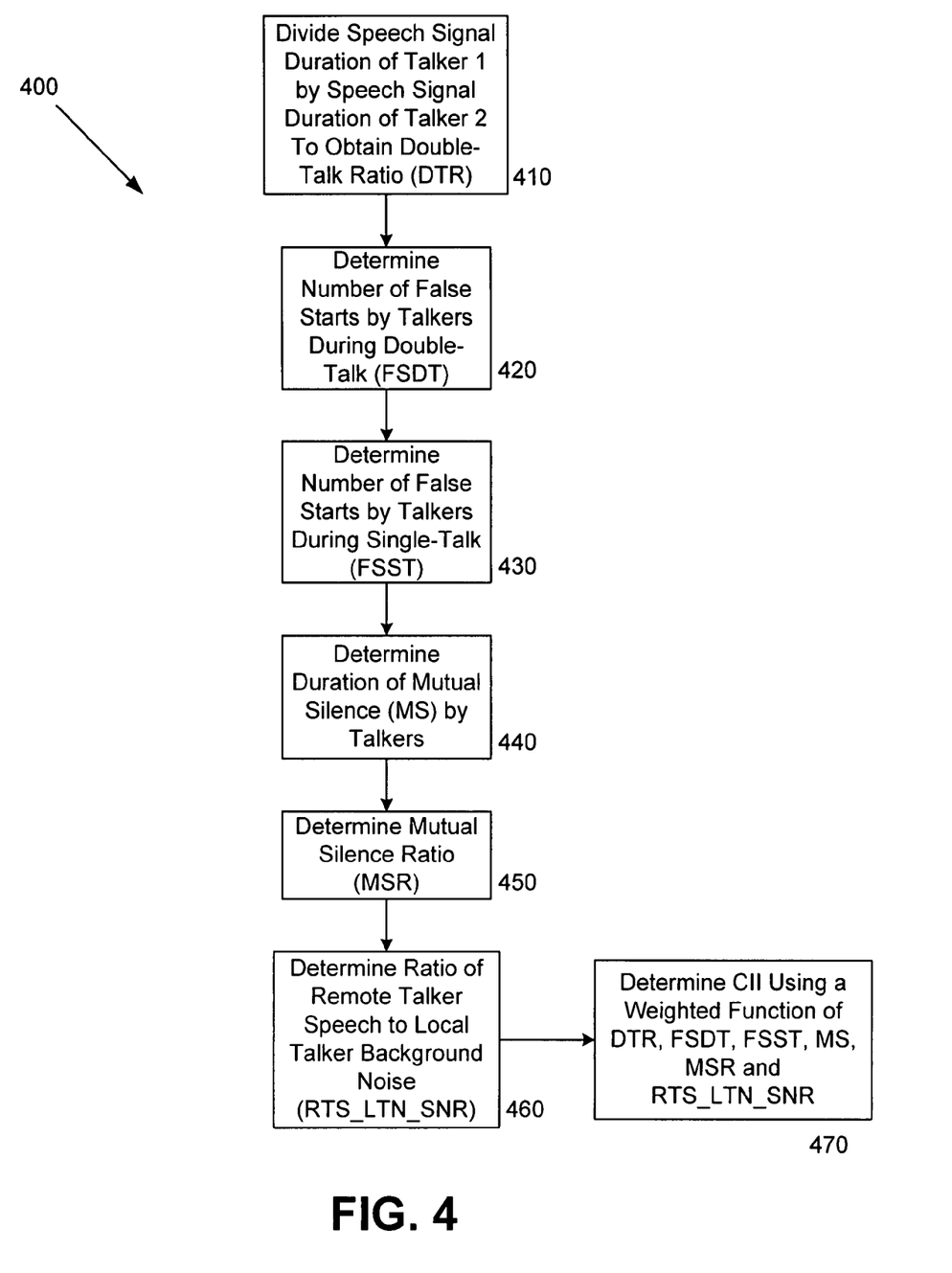
FIG. 4 illustrates a flow diagram of a conversational impairment index algorithm as part of the conversational quality monitoring algorithm of FIG. 3, according to an embodiment of the present invention.

FIG. 4 illustrates a flow diagram of conversational impairment index (CII) algorithm 400 that can be performed at step 310 of conversational quality monitoring algorithm 300 of FIG. 3, according to an embodiment of the present invention. CII algorithm 400 may derive CII by weighting a number of conversation pattern parameters. In one embodiment, such parameters may include, but are not limited to the following:

a) Double-Talk Ratio (DTR). At step 410, CII algorithm 400 may calculate a double-talk ratio (DTR) parameter, as described below. During double-talk (i.e., when both talkers are talking), the speech signal duration of Talker A and Talker B are measured (e.g. Talker A at telephone 210 and Talker B at telephone 250), and A/B and B/A ratios are determined. The ratio of these two durations is referred to as Double-Talk Ratio (DTR). If the ratios are lower than a chosen threshold (low-DTR), the result is indicative of a conversational interference. If the ratios are larger than the threshold, the result is indicative of a natural conversation. However, in other embodiments, a single ratio may be used or the ratios may be weighted differently. Further, two or more thresholds or a curve may be used to determine interference or naturalness of the conversation from the perspective one or more parties.

b) Number of False Starts During Double-Talk (FSDT). At step 420, CII algorithm 400 may calculate a parameter indicative of Number of False Starts During Double-Talk (or an FSDT parameter), as described below. FSDT is the number of low-DTRs occurring during a predetermine period of time, such as a few seconds. If FSDT is more than a threshold, the result is indicative of a conversational interference. If FSDT is not more than the threshold, the result is indicative of a natural conversation. Further, two or more thresholds or a curve may be used to determine interference or naturalness of the conversation from the perspective one or more parties.

c) Number of False Starts during Single-Talk (FSST). At step 430, CII algorithm 400 may calculate a parameter indicative of Number of False Starts during Single-Talk (or an FSST parameter), as described below. When only one talker is speaking and the other is silent, i.e. single-talk period, the number of a pre-determined short-duration segment of speech of either talker is determined. If FSST is more than a threshold, the result is indicative of a conversational interference. If FSST is not more than the threshold, the result is indicative of a natural conversation. Further, two or more thresholds or a curve may be used to determine interference or naturalness of the conversation from the perspective one or more parties.

d) Mutual Silence (MS): At step 440, CII algorithm 400 may calculate a parameter indicative of Mutual Silence (or an MS parameter), as described below. The duration of simultaneous silence on both sides is determined. If MS is more than a threshold, the result is indicative of a conversational interference. If MS is not more than the threshold, the result is indicative of a natural conversation. Further, two or more thresholds or a curve may be used to determine interference or naturalness of the conversation from the perspective one or more parties.

e) Mutual Silence Ratio (MSR). At step 450, CII algorithm 400 may calculate a parameter indicative of Mutual Silence Ratio (or an MSR parameter), as described below. The rate of occurrence of MS is determined. If MSR is more than a threshold, the result is indicative of a conversational interference. If MSR is not more than the threshold, the result is indicative of a natural conversation. Further, two or more thresholds or a curve may be used to determine interference or naturalness of the conversation from the perspective one or more parties.

f) The Ratio of Remote Talker Speech to the Local Talker Background Noise (RTS_LTN_SNR). At step 460, CII algorithm 400 may calculate a parameter indicative of the Ratio of Remote Talker Speech to the Local Talker Background Noise (or an RTS_LTN_SNR parameter), as described below. This parameter quantifies the ease or difficulty for Talker A to hear Talker B given the environment in which Talker A is located. For example, if Talker A or the listener is in a noisy environment (car passing, café, pub, etc.) and the level of environmental noise is higher than the received far end talker speech, then the conversational ease is reduced, etc.

Lastly, at step 470, based on one or more of the above set of parameters and others, CII algorithm 400 derives the conversational interference index (CII) using a weighted function. The weighted function may take the form of a computational closed form equation or may be based on pattern classification models (statistical approach), or a combination of the two. The following provides several examples for deriving CII.

Example 1

Linear Combination, Power Low $$CII = \sum_n w_n (f_n)^{\alpha_n}$$

n Number of features used to derive CII, where n=6 as listed above
$w_n$ Feature-specific weight (includes normalizarion)
$\alpha_n$ Exponent associated with each feature
$f_n$ Value for each feature Example 2

Weighted Log Combination $$CII = \sum_n \log_{b_n} (w_n (f_n)^{\alpha_n})$$

$b_n$ indicates that the log base need not be the same for all features

The feature set={DTR, FSDT, FSST, MS, MSR, RTS_LTN_SNR}, where the weight and exponents for each feature will be derived based on subjective conversation evaluation. The impact of language and contents can be considered during this evaluation phase.

Example 3

Statistical Models

If we define the CII space as the set $C=\{c_1, c_2, \ldots, c_K\}$, where K can be finite or infinite. This set includes all possible values for CII. Similarly, we can define the feature space as the set $\Gamma_{cii}=\{F_1, F_2, \ldots, \}$, where each element consists of an n dimensional vector whose elements are {DTR, FSDT, FSST, MS, MSR, RTS_LTN_SNR}. The feature set may include all possible values for feature vector. Further, designing a classifier for statistical models may include:

Training phase: Define a training set consisting of a representative subset of feature space. These are the points in the feature space that one considers representative for a particular scenario (language, culture, age, etc.)

Labeling phase: Associate a value from the CII space to each element of the training set. (Experimentation and subjective evaluation.)

Define a probabilistic model (example, probability density functions, neural networks, Markov models, etc linking feature space to CII space) or a heuristic rules (example: support vector machine, etc) to model the labeling process. This is a trial and error process during which the designer attempts to find an appropriate model that mimics the labeling process (previous phase.)

Testing and tuning: Once a model is selected, one can update the model (and model parameters) by subjecting it with feature outside the training set. Closer the CII outcome of the model to the subjective CII (i.e., higher the correlation), the lesser the need to tune or update the model.

Classification phase: Use the model to determine the CII given a new incoming.
Analyze the new conversation
Derive the features
Use the model to predict the CII: i.e. the model derives the most likely value of CII in the $C=\{c_1, c_2, \ldots, c_K\}$ space.

Additionally, one can also account for the history of the features during that conversation. In other words, given this new observation (feature), the models we have derived, the past history of features in this conversation, one must determine the most likely value of CII in the $C=\{c_1, c_2, \ldots, c_K\}$ space. The most likely value is the one that minimizes some error function. The appropriate error function can be determined upon the selection of models and experimentation, such as mini-max error rule, mean square error, and the like.

B. Technology Impairment Index (TII)

Figure 5:
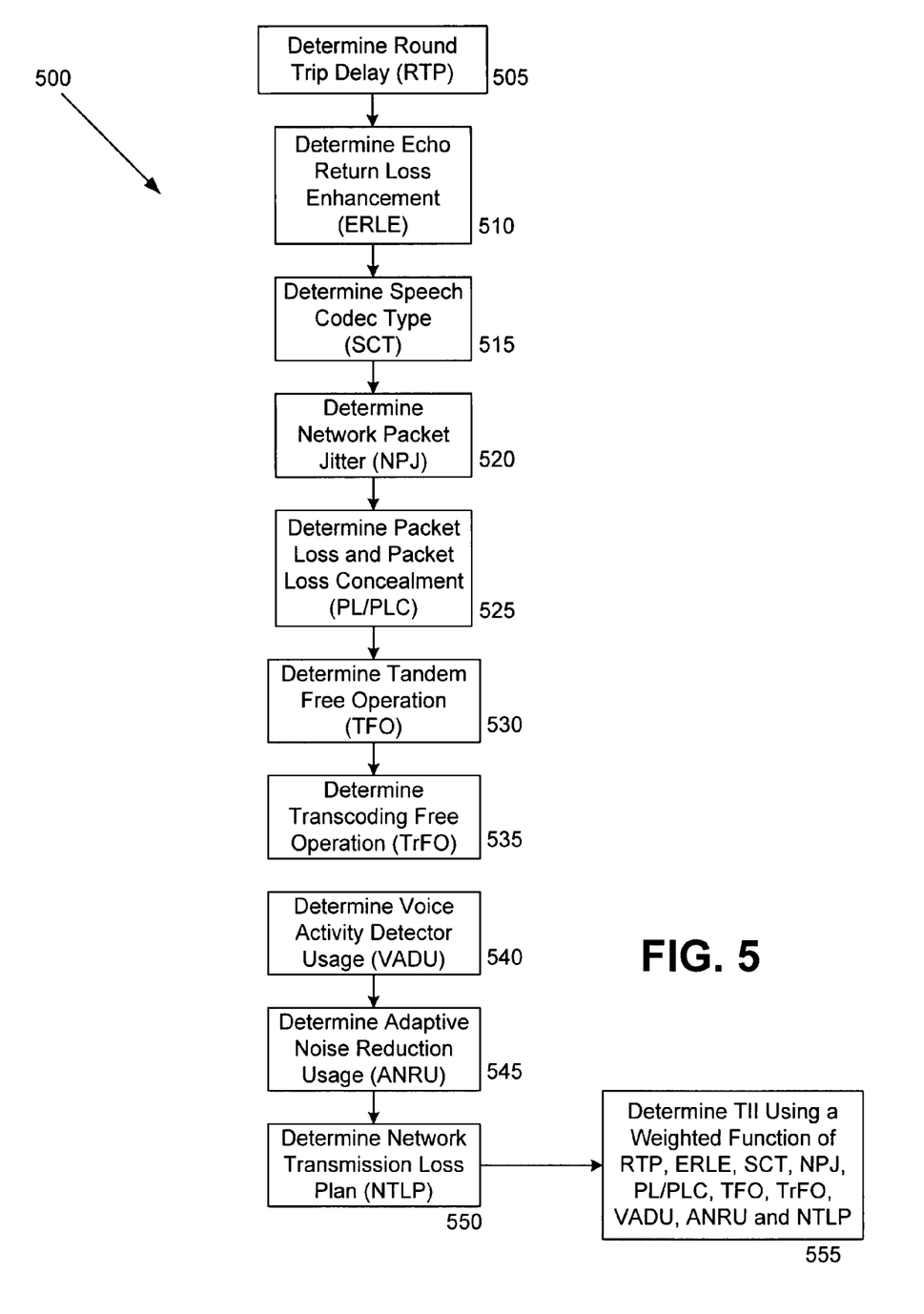
FIG. 5 illustrates a flow diagram of a technology impairment index algorithm as part of the conversational quality monitoring algorithm of FIG. 3, according to an embodiment of the present invention.

Technology Impairment Index or TII is a measure of the speech degradation due to the various voice technologies and components used in a telecommunication system. FIG. 5 illustrates a flow diagram of technology impairment index (TII) algorithm 500 for use by conversational quality monitoring algorithm 300 of FIG. 3, according to an embodiment of the present invention. As shown in FIG. 5, TII is derived by weighting one or more parameters, such as those described below.

a) Round Trip Delay (RTD). At step 505, TII algorithm 500 may calculate a parameter indicative of Round Trip Delay (or an RTD parameter), as described below. The round-trip delay value at each end is measured using an algorithm, such as the algorithm described in U.S. patent application Ser. No. 11/301,898, filed Dec. 13, 2005, entitled "Delay Estimation and Audio Signal Identification Using Perceptually Matched Spectral Evolution," which is hereby incorporated into the present application in its entirety. If RTD values are larger than a chosen threshold, the result is indicative of impairment, and if RTD values are lower than the threshold, the result is indicative of non-impairment. Further, two or more thresholds or a curve may be used to determine existence of impairment or non-impairment.

b) Echo Return Loss Enhancement (ERLE). At step 510, TII algorithm 500 may calculate a parameter indicative of Echo Return Loss Enhancement (or an ERLE parameter), as described below. The echo return loss enhancement (i.e., the combination of hybrid echo return loss and amount of echo cancellation) is measured using various algorithms or techniques, such as those described in the above-incorporated patent application. If the ERLE values are low compared to a chosen threshold, the result is indicative of impairment. If the values are higher than the threshold, the result is indicative of non-impairment. Further, two or more thresholds or a curve may be used to determine existence of impairment or non-impairment.

c) Speech Codec Type (SCT). At step 515, TII algorithm 500 may calculate a parameter indicative of Speech Codec Type (or an SCT parameter), as described below. The type of speech codec is determined, and based on the speech codec being used during the call, the model classifies certain codecs as introducing greater impairment than other codecs. Therefore, if the codec type belongs to a poor class of codecs, it is construed as impairment, and if the codec type does not belong to the poor class of codecs, it is considered as non-impairment. Of course, in other embodiments, there may be several classes of codecs, or a grade may indicate the degree of impairment that a given codec may cause.

d) Network Packet Jitter (NPJ). At step 520, TII algorithm 500 may calculate a parameter indicative of Network Packet Jitter (or an NPJ parameter), as described below. The algorithm may use the packet-to-packet delay variation (also referred to as jitter) and quantify its impairment contribution. If the jitter is bursty and/or above a certain threshold, it is considered as impairment. If the jitter is random and below this threshold, it is considered as non-impairment.

e) Packet Loss and Packet Loss Concealment (PL/PLC). At step 525, TII algorithm 500 may calculate a parameter indicative of Packet Loss and Packet Loss Concealment (or a PL/PLC parameter), as described below. If packet loss exceeds a certain threshold and/or the type of PLC algorithm belongs to a chosen class, then it is construed as impairment. However, if packet loss does not exceed a certain threshold and the type of PLC algorithm does not belong to a chosen class, then it is construed as non-impairment.

f) Tandem Free Operation (TFO). At step 530, TII algorithm 500 may calculate a parameter indicative of Tandem Free Operation (or a TFO parameter), as described below. It is determined whether a tandem free operation exists in the network for the call, such that the absence of TFO is considered as impairment, and use of TFO is considered as non-impairment.

g) Transcoding Free Operation (TrFO). At step 535, TII algorithm 500 may calculate a parameter indicative of Transcoding Free Operation (or a TrFO parameter), as described below. It is determined whether a transcoding free operation exists in the network for the call such that absence of TrFO is considered as impairment, and used of TrFO is considered as non-impairment.

h) Voice Activity Detector Usage (VADU). At step 540, TII algorithm 500 may calculate a parameter indicative of Voice Activity Detector Usage (or a VADU parameter), as described below. The type of VAD being used during the call is determined, and the algorithm classifies certain VADs as introducing greater impairment than other VADs. Thus if the VAD type belongs to a chosen class of VADs, it is construed as impairment. If the VAD type does not belong to this chosen class of VADs, it is considered as non-impairment. Of course, in other embodiments, there may be several classes of VADs, or a grade may indicate the degree of impairment that a given VAD may cause.

i) Adaptive Noise Reduction Usage (ANRU). At step 545, TII algorithm 500 may calculate a parameter indicative of Adaptive Noise Reduction Usage (or an ANRU parameter), as described below. The type of ANR being used during the call is determined, wand the algorithm classifies certain ANRs as introducing greater impairment than other ANRs. Thus if the ANR type belongs to a chosen class of ANRs, it is construed as impairment. If the ANR type does not belong to this chosen class of ANRs, it is considered as non-impairment. Of course, in other embodiments, there may be several classes of ANRs, or a grade may indicate the degree of impairment that a given ANR may cause.

j) Network Transmission Loss Plan (NTLP). At step 550, TII algorithm 500 may calculate a parameter indicative of Network Transmission Loss Plan (or an NTLP parameter), as described below. The type of Loss Plan being used (e.g., SLRs, RLRs and OLRs) during the call is determined, and the algorithm classifies certain NTLPs as introducing greater impairment than other NTLPs. Thus, if the NTLP type belongs to a chosen class of NTLPs, it is construed as impairment. If the NTLPs type does not belong to this chosen class of NTLPs, it is considered as non-impairment. Of course, in other embodiments, there may be several classes of NTLPs, or a grade may indicate the degree of impairment that a given NTLP may cause Lastly, at step 555, based on one or more of the above set of parameters and others, TII algorithm 500 derives the technology impairment index (TII) using a weighted function. The weighted function may take the form of a computational closed form equation or may be based on pattern classification models (statistical approach), or a combination of the two. The following provides several examples for deriving TII.

Example 1

Linear Combination, Power Low $$TII = \sum_n w_n(f_n)^\alpha n$$

n Number of features used to derive CII, where n=10 as listed above $w_n$ Feature-specific weight (includes normalizarion)

$\alpha_n$ Exponent associated with each feature
$f_n$ Value for each feature

Example 2

Weighted Log Combination $$TII = \sum_n \log_{b_n}(w_n(f_n)^{\alpha_n})$$

$b_n$ indicates that the log base need not be the same for all features

The feature set={NTLP, ANR, VAD, TrFO, TFO, PLC, NPJ, SCT, ERLE, RTD, where the weight and exponents for each feature will be derived based on subjective conversation evaluations.

Example 3

Statistical Models

If we define the TII space as the set $T=\{t_1, t_2, \ldots, t_N\}$, where N can be finite or infinite. This set includes all possible values for TII. Similarly, we can define the feature space as the set $\Gamma_{tii}=\{F_1, F_2, \ldots, \}$, where each element consists of an n dimensional vector whose elements are {NTLP, ANR, VAD, TrFO, TFO, PLC, NPJ, SCT, ERLE, RTD}. The feature set may include all possible values for feature vector. Further, designing a classifier for statistical models may include:
  Training phase: Define a training set consisting of a representative subset of feature space. These are the points in the feature space that one considers representative for a particular scenario (technology framework, network, devices, etc.)
  Labeling phase: Associate a value from the TII space to each element of the training set. (Experimentation and subjective evaluation)
  Define a probabilistic model (example, probability density functions, neural networks, Markov models, linking feature space to TII space) or a heuristic rules (example: support vector machine, etc) to model the labeling process. This is a trial and error process during which the designer attempts to find an appropriate model that mimics the labeling process (previous phase).
  Testing and tuning: Once a model is selected, one can update the model (and model parameters) by subjecting it with feature outside the training set. Closer the TII outcome of the model to the subjective TII (i.e., higher the correlation), the lesser the need to tune or update the model.
  Classification phase: Use the model to determine the TII given a new incoming event.
    Analyze the new conversation
    Derive the features
    Use the model to predict the TII: i.e. the model derives the most likely value of TII in the $\Gamma_{tii}=\{F_1, F_2, \ldots, \}$ space.

Additionally, one can also account for the history of the features during that conversation. In other words, given this new observation (feature), the models we have derived, the past history of features in this conversation, one must determine the most likely value of TII in the $\Gamma_{tii}=\{F_1, F_2, \ldots, \}$ space. The most likely value is the one that minimizes some error function. The appropriate error function will be determined upon the selection of models and experimentation, such as mini-max error rule, mean square error, and the like.

C. Mapping Function (MF)

The Mapping Function (MF) component is a function, which maps the CII component and the TII component resulting in an overall measure of conversational quality. In one embodiment, MF is a weighted function that can be described by CQI=MF {CII, TII}.

The weighted function may take the form of a computational closed form equation or may be based on pattern classification models (statistical approach), or a combination of the two. The following provides some examples.

Example 1

Linear Combination, Power Low—Based on CII and TII Values $$CQMON = \sum_n w_n(f_n)^{\alpha_n}$$

n Number of features used to derive CQMON, where n<=18 as listed above
$w_n$ Feature-specific weight (includes normalizarion)
$\alpha_n$ Exponent associated with each feature
$f_n$ Value for each feature Example 2

Weighted Log Combination $$CQMON = \sum_n \log_{b_n}(w_n(f_n)^{\alpha_n})$$

$b_n$ indicates that the log base need not be the same for all features

The feature set={CII, TII} or a subset of {DTR, FSDT, FSST, MS, MSR, RTS_LTN_SNR, NTLP, ANR, VAD, TrFO, TFO, PLC, NPJ, SCT, ERLE, RT, CII, TII}. The weight and exponents for each feature will be derived based on subjective conversation evaluation. The impact of language and contents can be considered during this evaluation phase.

Example 3

Statistical Models of CQMON (Mapping Functions)

If we define the CQMON space as the set $Q=\{q_1, q_2, \ldots, q_M\}$, where M can be finite or infinite. This set may include all possible values for CQMON. Similarly, we can define the feature space as the set $\Gamma_{cqmon}=\{F_1, F_2, \ldots, \}$, where each element consists of an n dimensional vector whose elements are a subset of {DTR, FSDT, FSST, MS, MSR, RTS_LTN_SNR, NTLP, ANR, VAD, TrFO, TFO, PLC, NPJ, SCT, ERLE, RT, CII, TII}. The feature set may include all possible values for feature vector. Further, designing a classifier for statistical models may include:
  Training phase: Define a training set consisting of a representative subset of feature space. These are the points in the feature space that one considers representative for a particular scenario (technology framework, network, devices, etc.)

Labeling phase: Associate a value from the CQMON space to each element of the training set. (Experimentation and subjective evaluation)

Define a probabilistic model (example, probability density functions, neural networks, Markov models, linking feature space to CQMON space) or a heuristic rules (example: support vector machine, etc) to model the labeling process. This is a trial and error process during which the designer attempts to find an appropriate model that mimics the labeling process (previous phase).

Testing and tuning: Once a model is selected, one can update the model (and model parameters) by subjecting it with feature outside the training set. Closer the CQMON outcome of the model to the subjective CQMON (i.e., higher the correlation), the lesser the need to tune or update the model.

Classification phase: Use the model to determine the CQMON given a new incoming event.

Analyze the new conversation

Derive the features

Use the model to predict the CQMON: i.e. the model derives the most likely value of CQMON in the $\Gamma_{cqmon} = \{F_1, F_2, \ldots, \}$ space.

Additionally, one can also account for the history of the features during that conversation. In other words, given this new observation (feature), the models we have derived, and the past history of features in this conversation, one must determine the most likely value of CQMON in the $\Gamma_{cqmon} = \{F_1, F_2, \ldots, \}$ space. The most likely value is the one that minimizes some error function. The appropriate error function will be determined upon the selection of models and experimentation, such as mini-max error rule, mean square error, and the like.

D. Summary of Some Key Advantages and Features of CQMON

The above-described CQMON has many advantages over existing models, and a few of the aforementioned advantages and key features are summarized below:

1. CQMON quantifies and measures the overall or total conversational quality or ease of conversation. It is a model of multi-way voice quality or conversational voice quality and not just one-way voice quality. It is substantially more representative of a true usage scenario of telecommunication systems.

2. CQMON derives a set of parameters that are based on unique patterns of human conversation. These parameters are then used to compute a novel measure of conversational interference.

3. CQMON takes into account an extended set of various voice technology components that have the potential of degrading voice and conversational quality. Hence it has a greater scope of coverage and application than the existing models. Most one-way voice quality models capture the effects of packet loss, speech codecs, network jitter, and VAD. Existing models are not able to and do not capture effects of other voice technologies such as echo cancellers, noise reduction technology, CNG, transcoding-free and tandem-free operation, network loss plan, wide-band telephony, multi-party communication, etc.

4. CQMON utilizes a unique mapping function linking technology components and conversational patterns in predicting overall conversational quality or the ease of conversation in communication systems.

Accordingly, the conversational quality monitor (or CQMON) algorithm of the present application can serve as a predictor of user satisfaction regarding conversational effort.

CQMON can also guide the management and deployment of these various voice technologies in a network. This knowledge would be of great benefit to network operators and service providers of telecommunication systems that can monitor the conversational quality, and consequently improve and enhance communication quality in real conversations.

II. Adaptive Network Optimization

In one embodiment, the network may monitor itself and take any and all appropriate actions to mitigate the effects of impairments with the objective of enhancing voice quality. For example, as described above, gateway 220 or 240 may collect a set of metrics and parameters, and using these metrics computations, determine the voice quality and the impact on voice quality of the call in progress. Then, based on a set of pre-determined approaches, allow the network, such as gateways 220 and 240, to self-correct or adaptively reconfigure itself, such that voice quality is further enhanced. The set of metrics and parameters captured may include the contribution from various components of the network being deployed along with the associated technologies. For example, the technologies and components would include, but not be limited to, the type of speech codecs used, the type of terminals used, the magnitude of the gain being used, the amount of cancellation being provided by the echo cancellers, the type of VAD, the amount and type of packet loss, jitter and delay, the frame or packet size, etc.

Figure 6:
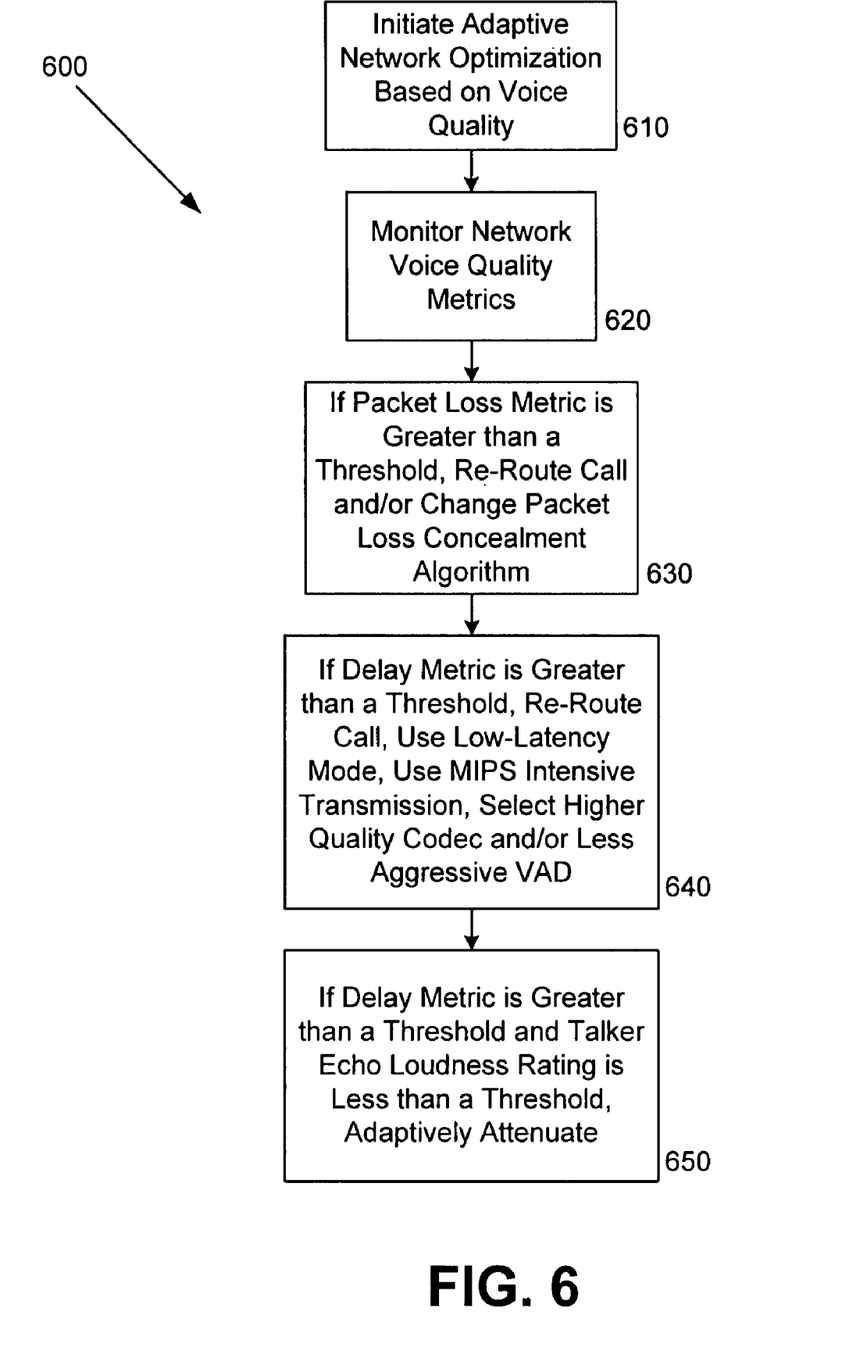
FIG. 6 illustrates a flow diagram for adaptively optimizing the voice quality in a telecommunication system, according to an embodiment of the present invention.

In one embodiment, the network quality may be determined using the LQ model. Yet, in another embodiment, the network quality may be determined using the CQMON model, or one or more metrics described above for determining the CQMON index. FIG. 6 illustrates a flow diagram of an adaptive optimization algorithm 600 for adaptively optimizing the voice quality in telecommunication system 200 of FIG. 2, according to an embodiment of the present invention.

As shown in FIG. 6, at step 610, a component of the network or telecommunication system 200 may initiate adaptive optimization algorithm 600 during a call for adaptively optimizing the voice quality. Next, at step 620, the adaptive optimization algorithm 600 will start monitoring various metrics, such as the metrics used for the LQ model or the metrics used for the CQMON model. Next, at step 630, based on the metrics, adaptive optimization algorithm 600 automatically adjusts the network conditions, impairments and parameters to improve voice and/or conversational quality. In one example shown in FIG. 6, by analyzing the metrics, adaptive optimization algorithm 600 may determine that the amount of packet loss is more than an acceptable threshold and may automatically employ a superior packet loss concealment algorithm. The type of packet loss algorithm can be chosen based on the type of packet loss. For example, some packet loss concealment algorithms perform better for bursty packet losses, and some perform better for random packet losses, etc. In addition, rather than employing a different packet loss concealment algorithm, the network may re-route the call to improve the quality.

In yet another example of FIG. 6, at step 640, by analyzing the metrics, adaptive optimization algorithm 600 may determine that the amount of delay is more than an acceptable threshold and may automatically employ a low latency mode, re-route the call, use MIPS intensive transmission, select higher quality codec and/or use a less aggressive VAD. In a further example of FIG. 6, at step 650, by analyzing the metrics, adaptive optimization algorithm 600 may determine that the amount of delay is more than an acceptable threshold and the talker echo loudness is low. In response, the network may adaptively attenuate the voice signal to improve the voice and conversational quality, and/or re-route the call.

III. Embedded Probe Signal for Estimating the Effects of Communication System

The previous sections describe conversation quality measurement non-intrusive systems and methods. In other words, the measurements are performed with an aim to not affect the conversational and listening abilities of the users or adversely affecting the quality itself. The present section introduces an embedded probe signal that is considered intrusive in nature. However, in one embodiment of the present invention, as described below, the intrusiveness of the embedded probing signals is also substantially diminished.

According to one embodiment, probe signals may be transmitted by each gateway 240 or 240 to its local telephone or communication device 210 or 250, and also over packet network 230 to the remote gateway 240 or 220, respectively. When the sending gateway receives a reflection of the probe signal from its local telephone and/or over packet network 230, the sending gateway may determine the current conditions and impairments by analyzing the reflection of the probe signal or the returned probe signal.

Figure 7:
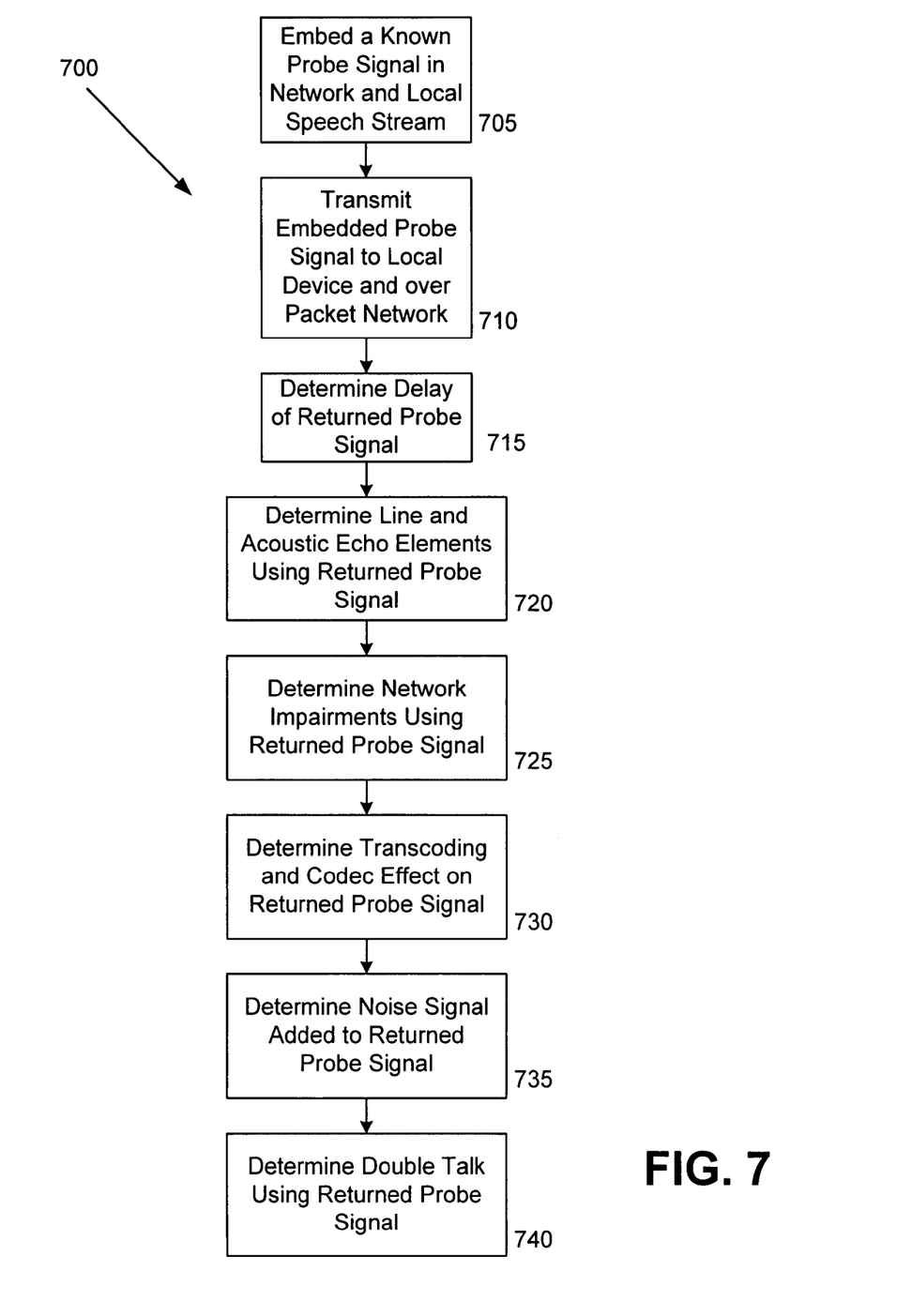
FIG. 7 illustrates a flow diagram for using a probe signal to determine the voice quality in a telecommunication system of, according to an embodiment of the present invention.

FIG. 7 illustrates a flow diagram of probe signal algorithm 700 that is used to determine the voice quality in the telecommunication system of FIG. 2, according to an embodiment of the present invention. With reference to FIG. 7, at step 705, first gateway 220 embeds a known probe signal in the speech signal being transmitted over packet network 230 and/or the speech signal being transmitted to first communication device 210. Next, at step 710, first gateway 220 transmits the speech stream with embedded probe signal over packet network 230 and/or first communication device 210. In step 715, when the probe signal is reflected back to first gateway 220 as returned probe signal, first gateway 220 may analyze the returned probe signal and deduce various impacts of telecommunication communication system 200 on the probe signal and, thus, some network parameters. For example, at step 715, first gateway 220 may determine the communication delay based on the amount of time it takes for the probe signal to return to first gateway 220. In one embodiment, the delay may be measured using the algorithm described in U.S. patent application Ser. No. 11/301,898, which has been incorporated into the present application. As another example, at step 720, the gateway may analyze the returned probe signal and determine line and acoustic echo elements. In yet other example steps 725, 730, 735 and 740 of FIG. 7, the gateway may analyze the returned probe signal and determine network impairments, transcoding and codec effect on the returned probe signal, the amount of noise added to the returned probe signal, and detect double talk to assist the echo canceller.

The returned probe signal may be used to determine other effects of the communication system. For example, the returned signal may also be used to determine the amount of packet loss in the network. In other words, when a portion of the probe signal is not returned, the missing portion of the probe signal can be indicative of the percentage of packet loss over the network.

In one embodiment, the probe signal is embedded in the speech stream such that the probe signal is masked by the voice. In other words, the probe signal is not sent when there is silence, but the probe signal is embedded in the voice and the probe signal is adjusted to follow the contour of the voice signal and is transmitted at a lower level than the voice signal, so that the probe signal cannot be heard by the user and does not affect the conversational quality. In such embodiment, for example, the spectrum and the level of the speech signal are monitored and small pieces of the probe signal are intermittently, but at known intervals, are embedded in the speech signal, according to the current spectrum and level of the speech signal to mask out the probe signal. The masking can be achieved if the probe signal follows a spectrum similar to that of the speech signal, and is transmitted at a lower level than the speech signal (such as 20 dB below), so the probe signal cannot be heard by the users.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of quantifying a voice quality in a telecommunication system including a first gateway in communication with a second gateway over a packet network, the method comprising:

embedding a probe signal in a first speech signal from a first talker to generate a third speech signal, the first speech signal having a voice portion and a silence portion, wherein embedding includes masking the probe signal by the voice portion of the first speech signal;

transmitting the third speech signal to the second gateway over the packet network;

receiving a modified third speech signal over the packet network from the second gateway; and deriving speech parameters from a first speech signal of the first talker received by the first gateway over a first communication line and the modified third speech signal received by the first gateway from the second gateway over the packet network;

determining a conversational impairment index using the speech parameters;

deriving technology parameters based on voice technology and components in the telecommunication system;

determining a technology impairment index using the technology parameters; and mapping the conversational impairment index and the technology impairment index into a conversational quality index to quantify the voice quality in the telecommunication system.

2. The method of claim 1, wherein the determining the conversational impairment index applies weighting to the speech parameters.

3. The method of claim 1, wherein the determining the technology impairment index applies weighting to the technology parameters.

4. The method of claim 1, wherein the speech parameters include one or more of the following parameters: a double-talk ratio (DTR), a number of false starts during double-talk (FSDT), a number of false starts during single-talk (FSST), a mutual silence (MS), a mutual silence ratio (MSR) and a ratio of the first talker speech to the second talker background noise (RTS_LTN_SNR).

5. The method of claim 1, wherein the speech parameters include the following parameters: a double-talk ratio (DTR), a number of false starts during double-talk (FSDT), a number of false starts during single-talk (FSST), a mutual silence (MS), a mutual silence ratio (MSR) and a ratio of the first talker speech to the second talker background noise (RTS_LTN_SNR).

6. The method of claim 1, wherein the technology parameters include one or more of the following parameters: A round trip delay (RTD), an echo return loss enhancement (ERLE), a speech codec type (SCT), a network packet jitter (NPJ), a packet loss and packet loss concealment (PL/PLC), a tandem free operation (TFO), a transcoding free operation (TrFO), a voice activity detector usage (VADU), an adaptive noise reduction usage (ANRU) and a network transmission loss plan (NTLP).

7. The method of claim 1, wherein the technology parameters include the following parameters: A round trip delay (RTD), an echo return loss enhancement (ERLE), a speech codec type (SCT), a network packet jitter (NPJ), a packet loss and packet loss concealment (PL/PLC), a tandem free operation (TFO), a transcoding free operation (TrFO), a voice activity detector usage (VADU), an adaptive noise reduction usage (ANRU) and a network transmission loss plan (NTLP).

8. A computer readable media including a software program residing in a gateway and for execution by a controller of the gateway for quantifying a voice quality in a telecommunication system including the first gateway in communication with a second gateway over a packet network, the software program comprising:
    code for embedding a probe signal in a first speech signal from a first talker to generate a third speech signal, the first speech signal having a voice portion and a silence portion, wherein embedding includes masking the probe signal by the voice portion of the first speech signal;
    code for transmitting the third speech signal to the second gateway over the packet network;
    code for receiving a modified third speech signal over the packet network from the second gateway; and
    code for deriving speech parameters from a first speech signal of the first talker received by the first gateway over a first communication line and the modified third speech signal received by the first gateway from the second gateway over the packet network;
    code for determining a conversational impairment index using the speech parameters;
    code for deriving technology parameters based on voice technology and components in the telecommunication system;
    code for determining a technology impairment index using the technology parameters; and
    code for mapping the conversational impairment index and the technology impairment index into a conversational quality index to quantify the voice quality in the telecommunication system.

9. The computer readable media of claim 8, wherein the code for determining the conversational impairment index applies weighting to the speech parameters.

10. The computer readable media of claim 8, wherein the code for determining the technology impairment index applies weighting to the technology parameters.

11. The computer readable media of claim 8, wherein speech parameters include one or more of the following parameters: a double-talk ratio (DTR), a number of false starts during double-talk (FSDT), a number of false starts during single-talk (FSST), a mutual silence (MS), a mutual silence ratio (MSR) and a ratio of the first talker speech to the second talker background noise (RTS_LTN_SNR).

12. The computer readable media of claim 8, wherein the technology parameters include one or more of the following parameters: A round trip delay (RTD), an echo return loss enhancement (ERLE), a speech codec type (SCT), a network packet jitter (NPJ), a packet loss and packet loss concealment (PL/PLC), a tandem free operation (TFO), a transcoding free operation (TrFO), a voice activity detector usage (VADU), an adaptive noise reduction usage (ANRU) and a network transmission loss plan (NTLP).

13. A first gateway for quantifying a voice quality in a telecommunication system including the first gateway in communication with a second gateway over a packet network, the first gateway comprising:
    a controller configured to:
        embed a probe signal in a first speech signal from a first talker to generate a third speech signal, the first speech signal having a voice portion and a silence portion, wherein embedding includes masking the probe signal by the voice portion of the first speech signal;
        transmit the third speech signal to the second gateway over the packet network;
        receive a modified third speech signal over the packet network from the second gateway;
        derive speech parameters from a first speech signal of the first talker received by the first gateway over a first communication line and the modified third speech signal received by the first gateway from the second gateway over the packet network;
    a voice quality monitoring module configured to determine a conversational impairment index using the speech parameters;
    the voice quality monitoring module further configured to derive technology parameters based on voice technology and components in the telecommunication system;
    the voice quality monitoring module further configured to determine a technology impairment index using the technology parameters; and
    the voice quality monitoring module further configured to map the conversational impairment index and the technology impairment index into a conversational quality index to quantify the voice quality in the telecommunication system.

14. The first gateway of claim 13, wherein the voice quality monitoring module is further configured to apply weighting to the speech parameters for determining the conversational impairment index.

15. The first gateway of claim 13, wherein the voice quality monitoring module is further configured to apply weighting to the technology parameters for determining the technology impairment index.

16. The first gateway of claim 13, wherein the speech parameters include one or more of the following parameters: a double-talk ratio (DTR), a number of false starts during double-talk (FSDT), a number of false starts during single-talk (FSST), a mutual silence (MS), a mutual silence ratio (MSR) and a ratio of the first talker speech to the second talker background noise (RTS_LTN_SNR).

* * * * *